US005644784A

United States Patent [19]
Peek

[11] Patent Number: 5,644,784
[45] Date of Patent: Jul. 1, 1997

[54] LINEAR LIST BASED DMA CONTROL STRUCTURE

[75] Inventor: Gregory A. Peek, Hillsboro, Oreg.

[73] Assignee: Intel Corporation, Santa Clara, Calif.

[21] Appl. No.: 398,439

[22] Filed: Mar. 3, 1995

[51] Int. Cl.[6] ................................................. G06F 13/28
[52] U.S. Cl. ........................................... 395/844; 395/855
[58] Field of Search ................................... 395/842, 844, 395/853, 854, 855, 843, 846

[56] References Cited

U.S. PATENT DOCUMENTS 5,155,830  10/1992  Kurashige ........................... 395/844
5,251,303  10/1993  Fogg, Jr. et al. .................... 395/844
5,367,639  11/1994  Sodos ................................. 395/844
5,448,702   9/1995  Garcia, Jr. et al. ................. 395/844

*Primary Examiner*—Glenn A. Auve
*Attorney, Agent, or Firm*—Blakely, Sokoloff, Taylor & Zafman

[57] ABSTRACT

Linear list based direct memory access (DMA) control structure for controlling a DMA processor through a linear list of DMA descriptors in memory. A descriptor entry is deposited at the end of the linear list. Each descriptor entry has an address associated with their location in the linear list. A pointer to the linear list points to a single location in the linear Fist. A next descriptor entry is accessed by decrementing the address corresponding to the single location. The descriptor entries are read from the linear list of DMA descriptors DMA transfers are performed.

21 Claims, 7 Drawing Sheets

LINEAR LIST BASED DMA CONTROL STRUCTURE

BACKGROUND OF THE INVENTION

(1) Field of the Invention

The invention relates to DMA (Direct Memory Access) control structures, more particularly, to the methods and apparatus for controlling a DMA processor through a linear list of DMA descriptors in memory.

(2) Prior Art

Advanced DMA controllers typically use a linked list in memory to chain together a sequence of DMA transfer descriptors. Although this makes efficient use of memory, this method requires a complex DMA controller capable of traversing a list. This method, therefore, can be a burden on the central processing unit (CPU) to update the list.

One simple method by which a DMA controller operates is where the microprocessor writes directly into the DMA controller using an input/output (I/O) access with a special command in the microprocessor's language. This method of controlling the DMA controller during an I/O transfer is fairly slow and requires the microprocessor to monitor and direct the DMA controller. Thus, the DMA controller sits in an idle state while the microprocessor is getting ready to give the DMA controller the next command.

FIG. 1 is a flow diagram illustrating the general steps followed by an exemplary prior art method. In this prior art method, a CPU takes direct control of the DMA. In step 100, the CPU reads a status register to determine if a DMA transfer Is complete. The CPU continues to read the status register until the DMA transfer is complete, then in step 102, the DMA controller is checked to see if it is an idle state. In step 104, the CPU writes a control word to the DMA's mode register which describes the set-up of the DMA controller such as the width of the data being transferred. In step 106, the CPU writes the source address from which the data is being transferred from to a source address register, and in step 108 the CPU writes the destination address to which the data is being transferred to a destination address register.

In step 110, the CPU writes to a length register and in step 112, the CPU writes a start command to the DMA controller. In step 114, the DMA controller begins performing a DMA transfer. In step 116, when the DMA controller completes its DMA transfer, the DMA controller clears the status register to indicate to the CPU that the DMA transfer is complete. In this prior art method, the CPU must continuously monitor the DMA start and end activities by polling the status register and must execute various commands to write registers creating an inefficient use of CPU time.

FIG. 2 illustrates a prior art method using a more advanced DMA controller. Linked descriptors in memory 200 are pointed to by first descriptor pointer/internal register 202. The DMA controller reads commands from the CPU which the CPU has deposited into the memory for the DMA controller to fetch. The deposited descriptors are entered in the linked list in the memory.

With advanced DMA controllers, the microprocessor creates a table of commands, typically a linked list. The microprocessor may write a starting address to the DMA controller which points into the memory where the microprocessor has chosen to insert a starting address, a length, a destination address and a source address. Thus, the commands are linked together, for example with a link to a memory space containing a zero to indicate the end of the list. A drawback to this method is that in order for the microprocessor to update this linked list, it must spend time calculating the offset to the next block of instructions. The microprocessor must then insert the new pointer to the next block of instructions.

There is a great need for a more efficient method of updating DMA controller entries in memory, which dispenses with the need for the CPU to continuously monitor and poll the DMA activities. In addition to saving CPU time, such a method should save the DMA controller time by allowing for a more efficient method of reading new descriptor entries.

BRIEF SUMMARY OF THE INVENTION

The present invention provides a method for controlling a DMA process through a linear list of DMA descriptors in memory. The CPU writes descriptor entries into the linear list of DMA descriptors in the memory, and a DMA controller reads the descriptor entries from the linear list of DMA descriptors to perform DMA transfers. The present invention may be especially applicable with a CPU which supports burst memory transfers, such as the Intel i1960 Microprocessor.

DETAILED DESCRIPTION OF THE INVENTION

Apparatus and methods for controlling a DMA controller through a linear list of DMA descriptors in memory is disclosed. The present invention makes efficient use of CPU burst transfers such as provided by an Intel i960 Microprocessor, to update a linear list of DMA control entries in memory using a single, efficient memory transfer. The DMA controller is simplified, as it only has to decrement a pointer to read the next entry in the descriptor list, rather than follow a linked list as has been done in prior art methods. Further, the DMA controller of the present invention automatically detects updates to the list, eliminating CPU and/or bus overhead.

Figure 1:
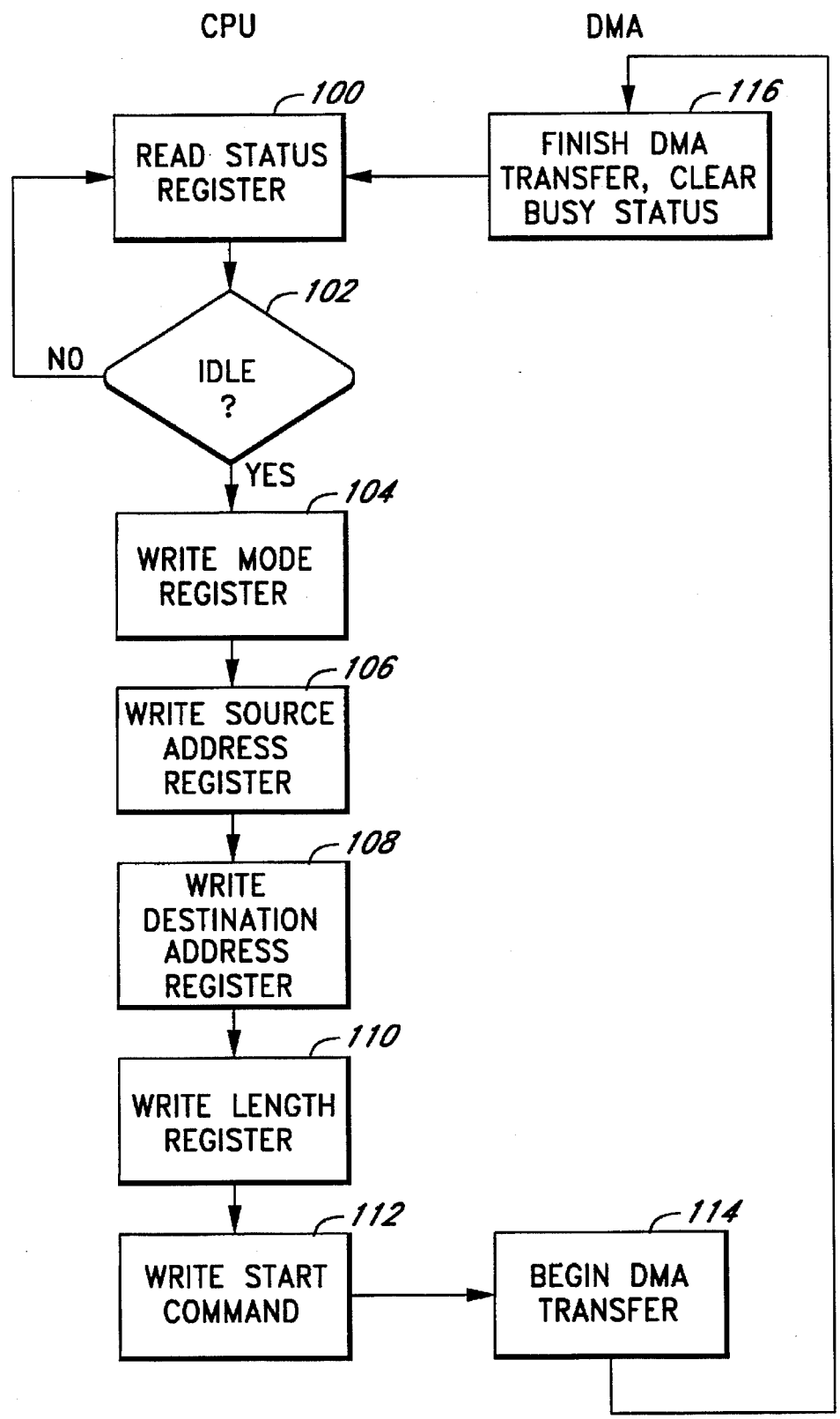
FIG. 1 is an exemplary flow chart illustrating the general steps followed using a prior art method of direct CPU control of DMA.
Figure 2:
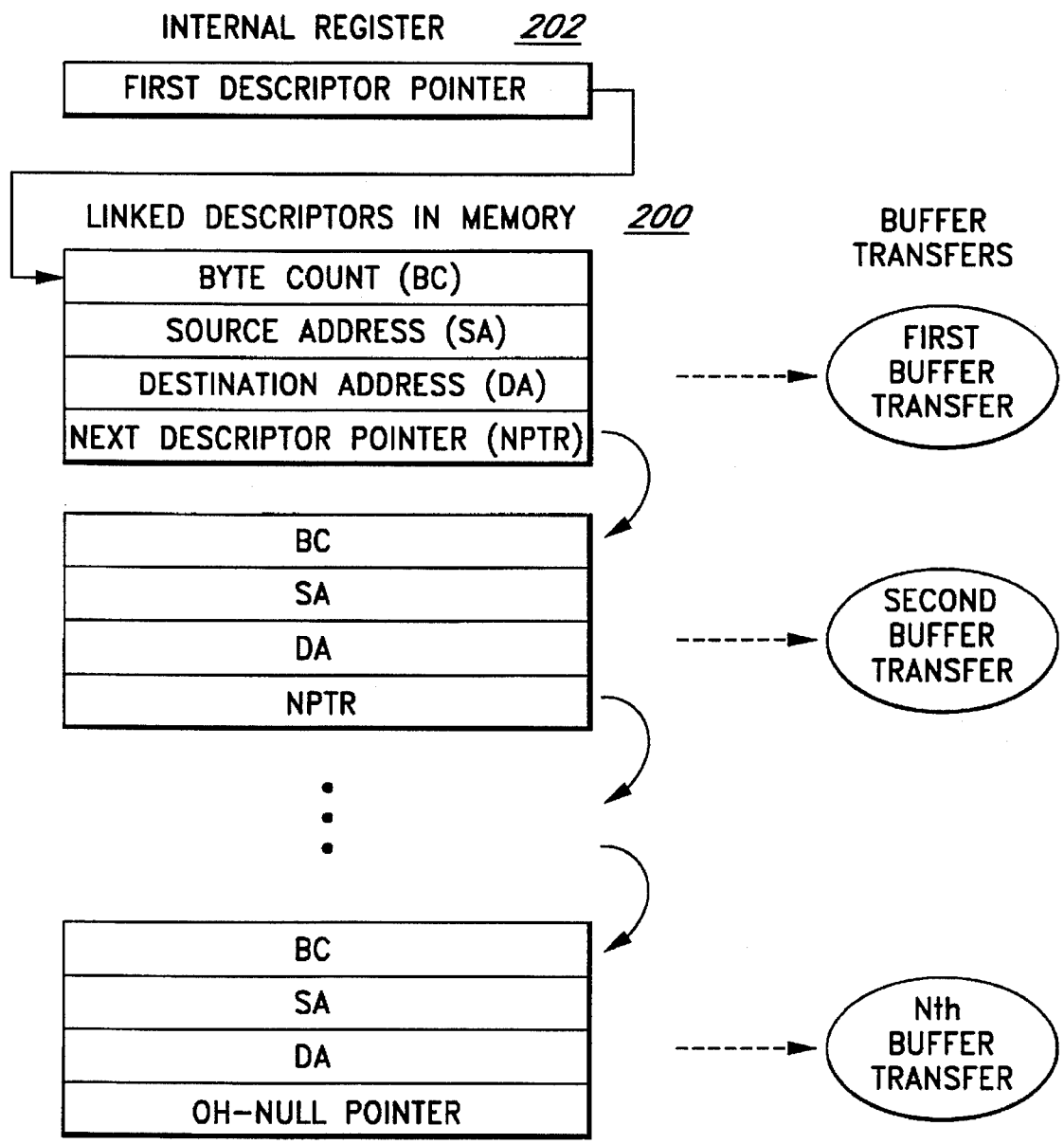
FIG. 2 illustrates an exemplary prior art method of DMA control using a memory structure.
Figure 3:
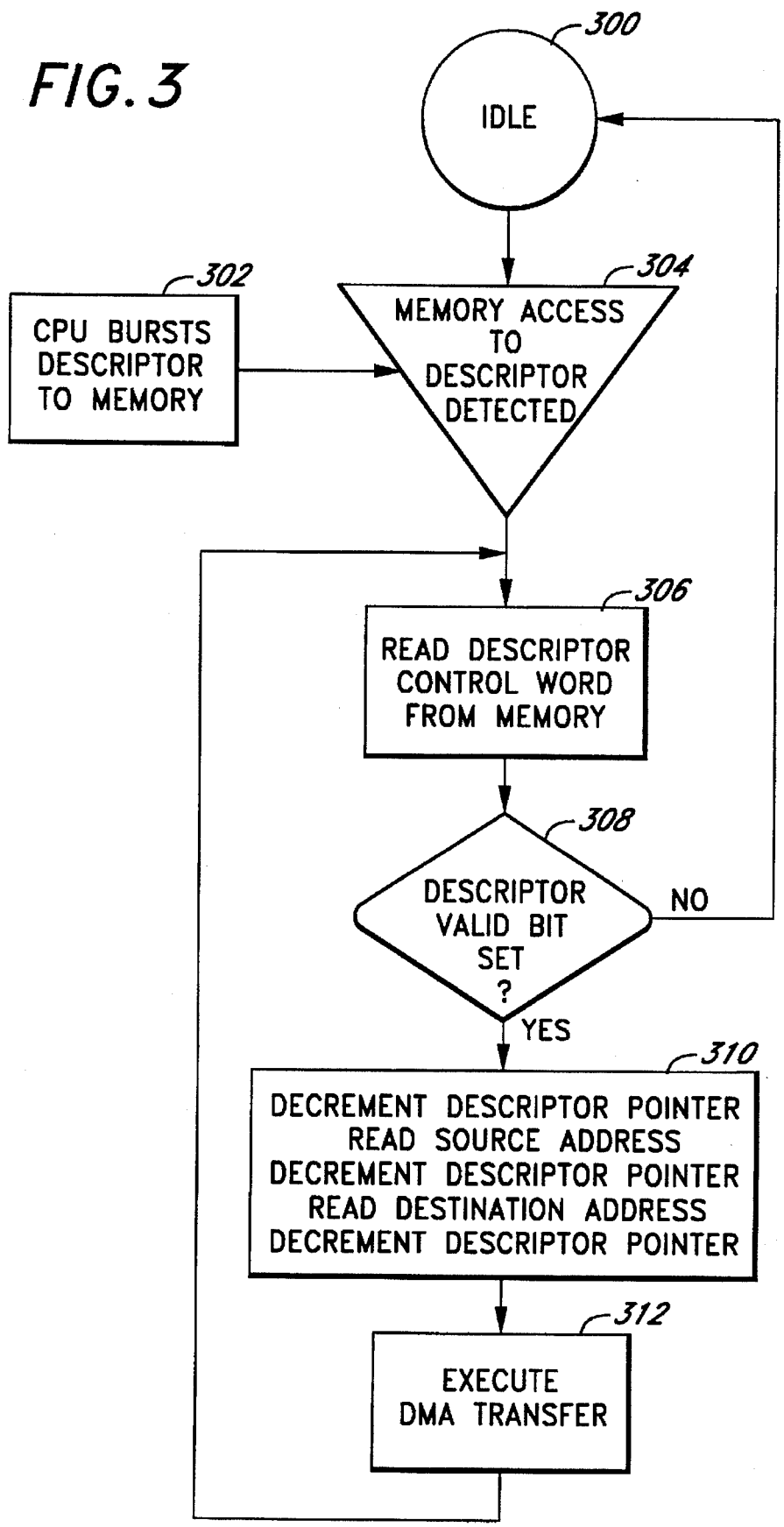
FIG. 3 is a flow diagram illustrating the general steps followed in an implementation of the DMA control structure of the present invention.

FIG. 3 is a flow diagram illustrating the general steps followed by the method of the present invention. In step 300, the DMA controller is in an idle state. When the CPU bursts a new descriptor entry to memory in step 302, the DMA controller detects this in step 304. In step 306, the DMA controller reads the memory location where the new descriptor entry has been deposited and reads the descriptor entry from the memory. In step 308, the DMA controller checks the descriptor entry to see if the descriptor entry has it's valid bit set.

If the descriptor entry has its valid bit set, then in step 310, the DMA controller decrements the descriptor pointer and reads the source address and the destination address for the DMA. The DMA controller continues to decrement the pointer pointing to various locations in memory, and continues therefore to point to the next descriptor entry. In step 312, once the descriptor entry is pointing to the control word of the next descriptor entry, the DMA transfer is executed. Once the DMA transfer is completed, the DMA controller reads the descriptor entry from a place in memory where it was last pointing to and checks to see if the descriptor entry is a valid descriptor entry (i.e. whether the valid bit is set).

Back in step 308, if the descriptor entry does not have its valid bit set, then the DMA controller returns to the idle state. If on the other hand, the CPU is queued up and several DMA's will be transferred, the valid bit is set. The DMA controller then fetches the next descriptor entry and performs another DMA transfer. The DMA controller continues through this loop as long as there is a valid bit set in the descriptor entry. At the end of the descriptor list, the valid bit will not be set and the DMA controller will return to idle state 300.

Figure 4:
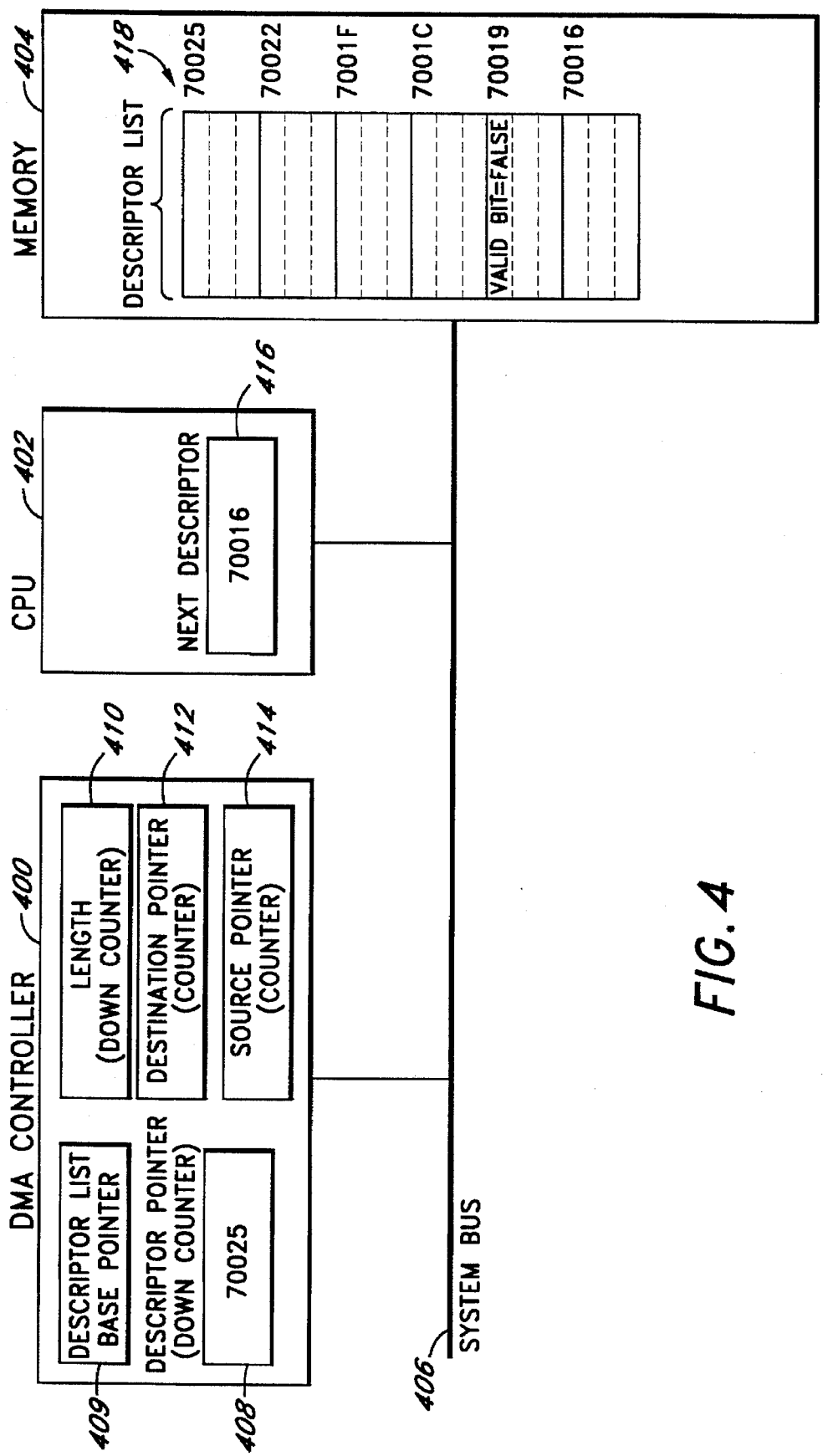
FIG. 4 illustrates a system block diagram with an exemplary DMA control structure used in the present invention.

FIG. 4 illustrates a block diagram of the system of the present invention. DMA controller 400, CPU 402 and memory 404 are all coupled to system bus 406. DMA controller 400 includes descriptor pointer 408, length register 410, destination pointer 412, and source pointer 414. CPU 402 contains next descriptor register 416. Memory 404 contains descriptor list 418. In memory 404, for the sake of illustration, only descriptor list 418 is illustrated. For this example, descriptor list 418 begins at address 70025 and ends at address 70019 where the valid bit is set to false.

A CPU such as an Intel i960 can transfer a burst of four thirty-two-bit words using one instruction. The entries in the table of DMA transfer descriptors are arranged such that a complete descriptor entry plus the control word of the descriptor entry fall within four words. Thus, CPU 402 can fill an entry plus set a valid status bit for the current entry and invalid/false status bit for the next entry using one transfer instruction. The data and descriptor list 418 is ordered such that DMA controller 400 cannot mistake a partially completed descriptor entry for a valid entry. When DMA controller reaches the end of descriptor list 418, DMA controller 400 stops fetching from descriptor list 418 and snoops the address bus for a write to the current location of the linear list pointer. If DMA controller 400 sees a match and detects that a new entry may have been deposited, DMA controller 400 rereads that location and rechecks the valid bit.

In the illustration, DMA controller 400 has its descriptor pointer 408 pointing to address 70025. DMA controller 400 will therefore fetch that location and the valid bit will be set to true in address 70025. The length count in address 70025 is then inserted into length register 410 of DMA controller 400. DMA controller 400 then decrements its descriptor pointer 408 to 70024 and fetches source pointer 414. Next, DMA controller 400 decrements its descriptor pointer 408 to 70023 and fetches destination pointer 412. DMA controller 400 decrements its descriptor pointer 408 to 70022 so that it will be prepared for the next set of descriptor fetches. DMA controller 400 then proceeds to execute the DMA transfer as specified in its length counter 410, destination pointer 412, and source pointer 414. When this DMA transfer has completed, DMA controller 400 begins to fetch the next descriptor beginning at the location in its descriptor pointer, address 70022.

If CPU 402 has a new descriptor entry it wants to insert into memory, the valid bit of address 70016 is set to false to create a new end of the table. CPU 402 then fills in addresses 70017 and 70018 with the source and destination pointers. At address 70019, CPU 402 writes a new control word with the length of 11 bits and a valid bit set to true. Thus, when the DMA is at address 70019, DMA controller 400 sees the valid bit set to true, and DMA controller 400 performs the DMA transfer.

Figure 5:
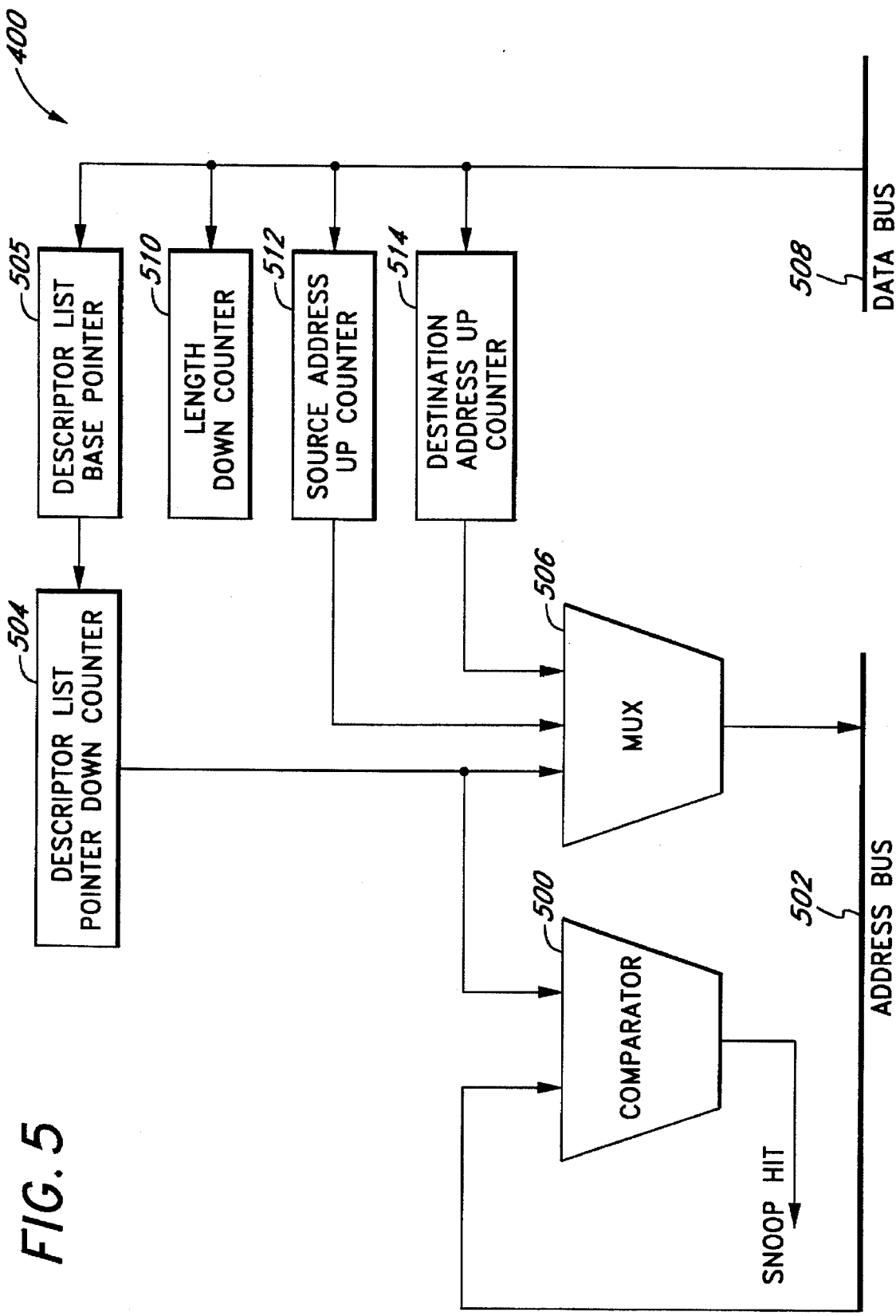
FIG. 5 illustrates a block diagram of DMA controller 400 referenced in FIG. 4.

FIG. 5 illustrates a block diagram of DMA controller 400 referenced in FIG. 4. Descriptor list pointer down counter 504 (descriptor list pointer) is coupled to descriptor list base pointer 505, comparator 500 and MUX 506. Length down counter 510, source address up counter 512 and destination address up counter 514 are coupled to data bus 508.

Descriptor list pointer 504 is written with an initial value by the CPU 402 which represents the address of the start of the descriptor list 418 in memory 404. Descriptor list pointer down counter 504 is coupled to comparator 500. When the address pointed to by pointer 504 matches the address in address bus 502, comparator 500 determines that CPU 402 is depositing a new descriptor entry in descriptor list 418 and comparator 500 has a snoop hit. With this snoop hit, DMA controller 400 begins fetching a descriptor entry from memory 404.

Descriptor list pointer down counter 504 is also coupled to multiplexer (MUX) 506. The address held in description list pointer down counter 504 is loaded onto address bus 502 through MUX 506. Memory 404 then responds with a control word containing a valid bit and a length on data bus 508. If this valid bit is true, the length count is loaded into length counter 510 from data bus 508. If the valid bit is false, DMA controller 400 stops fetching and waits for comparator 500 to detect a snoop hit. Once data bus 508 loads length counter 510, descriptor list pointer 504 is decremented. The decremented address, is loaded onto address bus 502 through MUX 506. Memory 404 then responds with a source address which is loaded in source address counter 512. Descriptor list pointer down counter 504 is decremented again, and the address in descriptor list pointer 504 is then loaded onto address bus 502. Memory 504 responds with loading data on data bus 508 which goes to destination address up counter 514. Descriptor list pointer down counter 504 is then decremented once more and is now pointing to the next descriptor entry. The length, source and destination addresses have now been loaded and DMA controller may commence its normal standard DMA operation.

Figure 6:
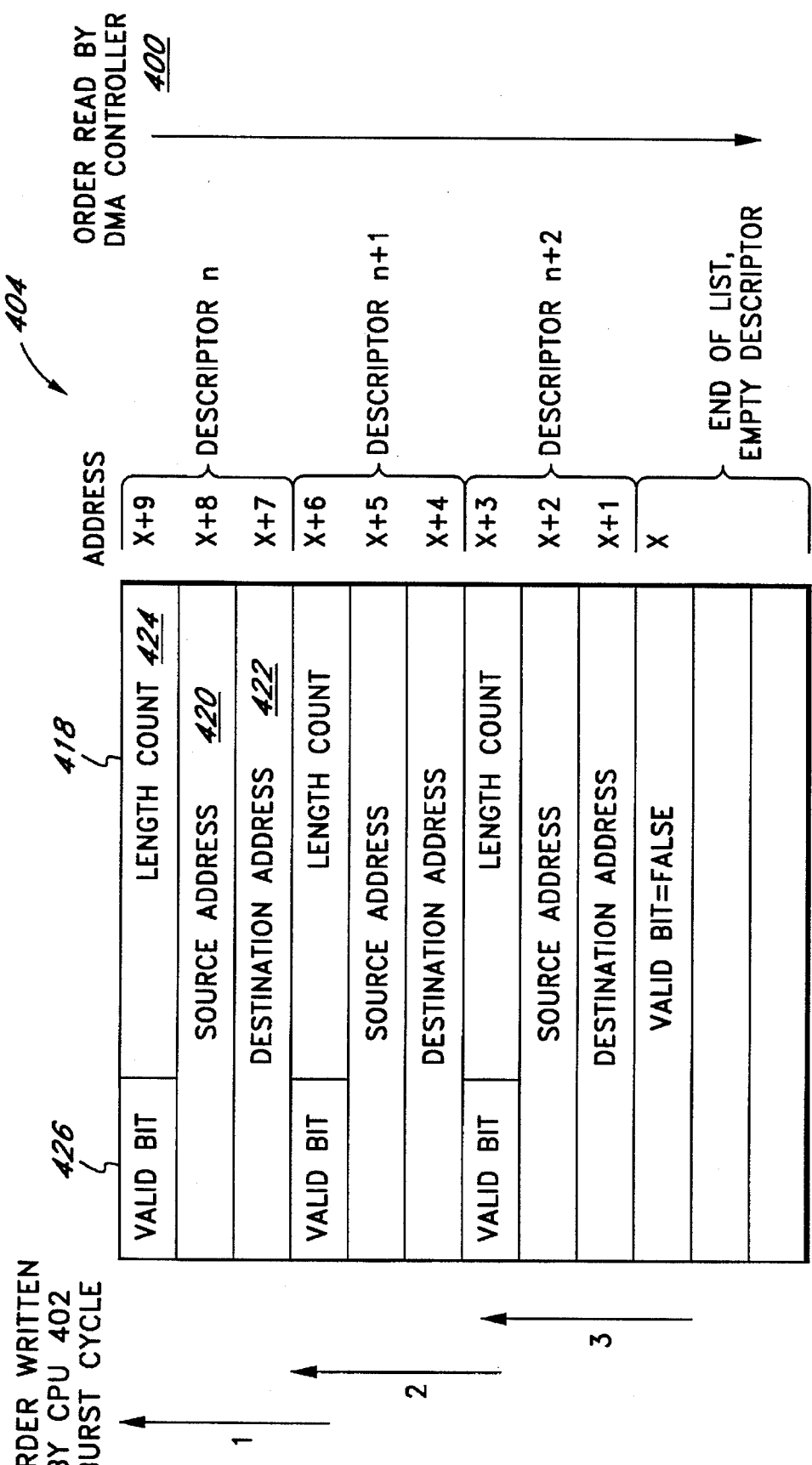
FIG. 6 is an exemplary linear list which may be used in the present invention.

FIG. 6 illustrates an exemplary linear list which may be implemented in the present invention. Each descriptor entry N, N+1 ... in linear list (descriptor list) 418 contains source address 420, destination address 422 and a control word which contains length count 424 and valid bit 426. Each time CPU 402 writes a descriptor to memory 404, the first word written is the control word 424 for the next descriptor with the valid bit 426 equaled to false. The next two words are destination address 422 and source address 420.

The last word written is the control word for the current descriptor entry, this control word contains command information, such as the type of the DMA transfer and length count 424 plus valid bit 426 set to true. CPU 402 writes descriptor entries from some address X to X+1, X+2, X+3 and so on. For example, a thirty-two-bit Intel® processor with a CPU burst cycle writes entries into memory in that order.

At address X, for example, CPU 402 sets a valid bit to false to mark the end of the list. DMA control 400 reads from a high address, for example, in this case from address X+9 down toward the low address one after another in a linear fashion but in reverse order fetching descriptor information straight from the high addresses towards the low addresses. Typically, memory systems do not burst in reverse, therefore DMA controller 400 reads words one at a time.

The DMA method of the present invention may be used in an intelligent 100 Mb/second Network PCI bus adapter to transfer data between host memory and local adapter memory. Through-put is a very important criteria of for example, 100 Mb Network adapters or embedded controllers. By using this method, overall throughput of a card over classic DMA control methods may be improved.

Figure 7:
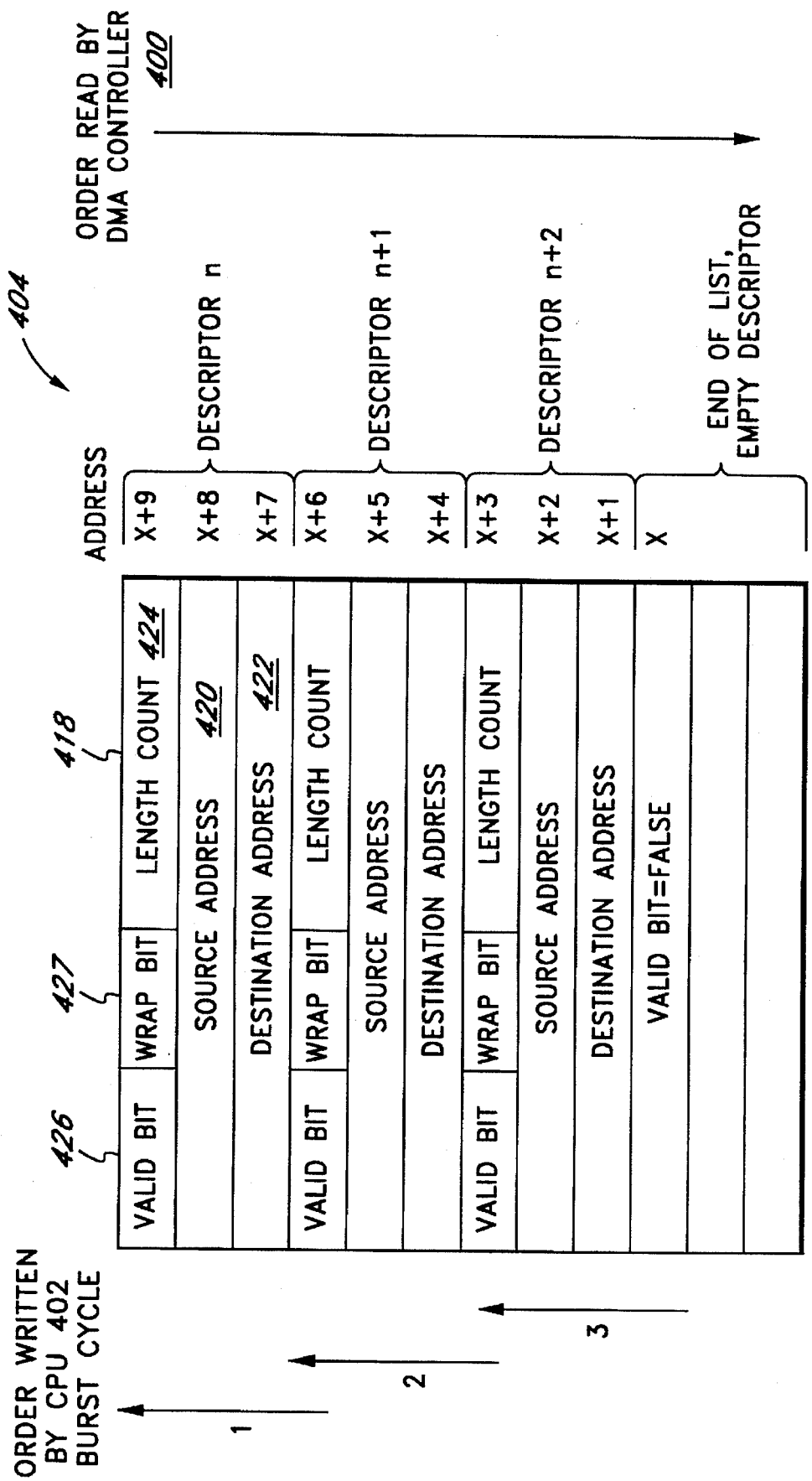
FIG. 7 illustrates an additional feature which may be implemented in the present invention.

FIG. 7 illustrates an additional feature which may be implemented in the present invention. In this embodiment of the present invention, linear list 418 may also have wrap bit 427 along with valid bit 426. Wrap bit 427 indicates the end of the list when it is set to true. If the list is at its end when the DMA reads the control word, instead of fetching for more information and executing the DMA, a descriptor list pointer from descriptor list base pointer 409 is reloaded. This descriptor list pointer contains the address which becomes the new beginning of the list.

What has been described is a method and apparatus for controlling a DMA controller through a linear list of DMA descriptors in memory. The present invention reduces the overhead required of the CPU, simplifies the DMA controller and improves bus bandwidth utilization.

While certain exemplary embodiments have been described in detail and shown in the accompanying drawings, it is to be understood that such embodiments are merely illustrative of and not restrictive on the broad invention, and that this invention is not to be limited to the specific arrangements and constructions shown and described, since various other modifications may occur to those with ordinary skill in the art.

What is claimed:

1. A method for controlling a DMA controller through a linear list of DMA descriptors in memory, said method comprising the steps of:

writing descriptor entries in said linear list of DMA descriptors, each said descriptor entry being added at the end of said linear list in said memory; and reading said descriptor entry from said linear list of DMA descriptors starting at an address pointed to by a descriptor list pointer, said reading being performed by the DMA controller, each descriptor entry being accessed by the DMA controller in the order said descriptor entries were written to said linear list.

2. The method of claim 1 wherein said step of reading further comprises the step of reading a descriptor control word associated with said descriptor entry.

3. The method of claim 1 further comprising the steps of:
   reading a wrap bit; and
   reading a new descriptor list pointer value from a descriptor list base pointer if said wrap bit is set to true.

4. The method of claim 3 further comprising the steps of:
   reading a valid bit associated with said descriptor entry; and
   reading a source address, a destination address and a length of data to be transferred associated with said descriptor entry if said valid bit is set to true.

5. The method of claim 4 further comprising the step of performing a DMA transfer.

6. An apparatus for controlling a DMA controller through a linear list of DMA descriptors in memory, said apparatus comprising:

a linear list of descriptor entries having a descriptor list pointer pointing to an address corresponding to one of said descriptor entries;

a CPU writing said descriptor entries in said linear list; and a DMA controller reading said descriptor entries from said linear list, each said descriptor entry being accessed by said DMA controller in the order said descriptor entries were written to said linear list.

7. The apparatus of claim 6 wherein said descriptor entries comprises:
   a control word;
   a source address from which data is to be transferred; and
   a destination address where said data is to be transferred.

8. The apparatus of claim 7 further comprising:
   a valid bit to indicate whether said descriptor entries are valid;
   a wrap bit to indicate whether there is a new beginning of said linear list; and
   a length of said data to be transferred.

9. The apparatus of claim 6 wherein said DMA controller further comprises:
   a descriptor list pointer pointing to an address in said linear list;
   a comparator coupled to said descriptor list pointer, said comparator for monitoring new entries in said linear list;
   a multiplexer coupled to said descriptor list pointer;
   a length counter for holding length loaded from said descriptor entries;
   a source address counter for holding source address loaded from said descriptor entries; and
   a destination address counter for holding destination address loaded from said descriptor entries.

10. An apparatus for controlling a DMA controller through a linear list of DMA descriptors in memory, said apparatus comprising:

means for storing a linear list of descriptor entries having a descriptor list pointer pointing to an address corresponding to one of said descriptor entries;

means for writing said descriptor entries in said linear list; and means for reading said descriptor entries from said linear list, each said descriptor entry being accessed by said DMA controller in the or linear list.

11. The apparatus of claim 10 wherein said descriptor entries comprises:
    means for storing a control word;
    means for storing a source address from which data is to be transferred; and
    means for storing a destination address where said data is to be transferred.

12. The apparatus of claim 11 further comprising:
    means for indicating whether said descriptor entries are valid;
    means for indicating whether there is a new beginning of said linear list; and
    means for storing a length of said data to be transferred.

13. The apparatus of claim 10 wherein said DMA controller further comprises:
    means for pointing to an address in said linear list;
    means for monitoring new entries in said linear list;

means for multiplexing coupled to said descriptor list pointer;

means for holding length loaded from said descriptor entries;

means for holding source address loaded from said descriptor entries; and means for holding destination address loaded from said descriptor entries.

14. A system for controlling a DMA controller through a linear list of DMA descriptors in memory, said system comprising:

a linear list of descriptor entries having a descriptor list pointer pointing to an address corresponding to one of said descriptor entries;

a CPU writing said descriptor entries in said linear list; and a DMA controller reading said descriptor entries from said linear list, each said descriptor entry being accessed by said DMA controller in the order said descriptor entries were written to said linear list.

15. The system of claim 14 wherein said descriptor entries comprises:

a control word;

a source address from which data is to be transferred; and a destination address where said data is to be transferred.

16. The system of claim 15 further comprising:

a valid bit to indicate whether said descriptor entries are valid;

a wrap bit to indicate whether there is a new beginning of said linear list; and a length of said data to be transferred.

17. The system of claim 14 wherein said DMA controller further comprises:

a descriptor list pointer pointing to an address in said linear list;

a comparator coupled to said descriptor list pointer, said comparator for monitoring new entries in said linear list;

a multiplexer coupled to said descriptor list pointer;

a length counter for holding length loaded from said descriptor entries;

a source address counter for holding source address loaded from said descriptor entries; and a destination address counter for holding destination address loaded from said descriptor entries.

18. A system for controlling a DMA controller through a linear list of DMA descriptors in memory, said system comprising:

means for storing a linear list of descriptor entries having a descriptor list pointer pointing to an address corresponding to one of said descriptor entries;

means for writing said descriptor entries in said linear list; and means for reading said descriptor entries from said linear list, each said descriptor entry being accessed by said DMA controller in the order said descriptor entries were written to said linear list.

19. The system of claim 18 wherein said descriptor entries comprises:

means for storing a control word;

means for storing a source address from which data is to be transferred; and means for storing a destination address where said data is to be transferred.

20. The system of claim 19 further comprising:

means for indicating whether said descriptor are valid;

means for indicating whether there is a new beginning of said linear list; and means for indicating a length of said data to be transferred.

21. The system of claim 18 wherein said DMA controller further comprises:

means for pointing to an address in said linear list;

means for monitoring new entries in said linear list;

means for multiplexing coupled to said descriptor list pointer;

means for holding length loaded from said descriptor entries;

means for holding source address loaded from said descriptor entries; and means for holding destination address loaded from said descriptor entries.

* * * * *

UNITED STATES PATENT AND TRADEMARK OFFICE
CERTIFICATE OF CORRECTION

PATENT NO. : 5,644,784
DATED : July 1, 1997
INVENTOR(S) : Gregory A. Peek It is certified that error appears in the above-identified patent and that said Letters Patent is hereby corrected as shown below:

In the Abstract at [57] delete "Fist." and insert --list. A pointer to the linear list points to a single location in the linear list.--

In the Abstract at [57] insert --and-- following "descriptors" and prior to "DMA"

In column 2 at line 22 delete "i1960" and insert --i960--.

In column 6 at line 48 delete "or" and insert --order said descriptor entries were written to said--

In column 8 at line 27 insert --entries-- following "descriptor" and prior to "are"

Signed and Sealed this

Eighth Day of December, 1998

*Attest:*

BRUCE LEHMAN

*Attesting Officer*  Commissioner of Patents and Trademarks